United States Patent
Griot

[15] 3,683,086
[45] Aug. 8, 1972

[54] DERIVATIVES OF ACETIC ACID FOR THE ALLEVIATION OF HYPERLIPEMIA

[72] Inventor: Rudolf G. Griot, Florham Park, N.J.
[73] Assignee: Sandoz Wander, Inc.
[22] Filed: July 13, 1970
[21] Appl. No.: 61,032

Related U.S. Application Data

[62] Division of Ser. No. 653,350, July 14, 1967, Pat. No. 3,546,229.

[52] U.S. Cl. .................. 424/267, 424/244, 424/274
[51] Int. Cl. ........................................ A61k 27/00
[58] Field of Search ................... 424/267, 274, 244

[56] References Cited

UNITED STATES PATENTS

| | | | |
|---|---|---|---|
| 3,332,957 | 7/1967 | Bencze | 260/294.3 |
| 3,448,105 | 6/1969 | Griot | 260/246 |
| 3,448,110 | 6/1969 | Griot | 260/294.3 |
| 3,452,081 | 6/1969 | Sprague et al. | 260/473 |
| 3,454,581 | 7/1969 | Griot | 260/294.3 |

OTHER PUBLICATIONS

Brunet et al., Bull. Soc, Chim., France, 5, 383– 7 (1964)
Yale, J. Med. Chem., 1(2), 121– 33 (1959)

*Primary Examiner*—Jerome D. Goldberg
*Attorney*—Gerald D. Sharkin and Frederick H. Weinfeldt

[57] ABSTRACT

The compounds are of the class of bis-(4-trifluoromethylphenoxy) acetic acid compounds, e.g., bis-(4-trifluoromethylphenoxy)acetic acid 1-methyl-4-piperidyl ester. The compounds are useful as hypocholesteremic/hypolipemic agents.

12 Claims, No Drawings

DERIVATIVES OF ACETIC ACID FOR THE ALLEVIATION OF HYPERLIPEMIA

This application is a division of Ser. No. 653,350, filed July 14, 1967, now U.S. Pat. No. 3,546,229.

This application is a division of Ser. No. 653,350, filed July 14, 1967, now U.S. Pat. No. 3,546,229.

This invention relates to derivatives of acetic acid. In particular, the invention pertains to basic esters of bis-(4-trifluoromethylphenoxy)acetic acid. The invention also relates to intermediates which are useful in preparing the above compounds.

The compounds of the present invention may be represented structurally as follows:

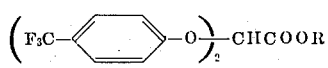   I wherein
R represents a basic alcohol residue of the formula:

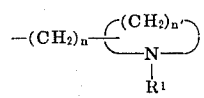

the point of attachment of the heterocyclic ring being at any one of the available positions;

$R^1$ represents lower alkyl, preferably containing from one to four carbon atoms, e.g., methyl, ethyl, propyl and butyl;

$n$ represents a whole number of from 0 to 4, inclusive; and $n'$ represents a whole number greater than 3 and less than 6, i.e., 4 or 5.

The term "TFMphenoxy" as used hereinafter denotes trifluoromethylphenoxy.

The above compounds are prepared by reacting a lower alkyl ester of bis-(4-TFMphenoxy)acetic acid or a di(lower)alkyl ester of bis-(4-TFMphenoxy) malonic acid with an appropriate alcohol. Alternatively, the compounds may be prepared by converting bis-(4-TFMphenoxy)acetic acid to its corresponding acid halide and then reacting the latter with an appropriate alcohol or alcoholate. These processes are illustrated by the following reaction scheme:

and in the presence of an alkali metal alkoxide, such as sodium methoxide or sodium ethoxide. The reaction is conveniently effected at an elevated temperature, preferably the reflux temperature of the system. The desired product is readily recovered in conventional manner.

In the alternative process, bis-(4-TFMphenoxy)acetic acid (IV) is converted to the corresponding acid halide (V) by reaction with thionyl chloride or other suitable reagent commonly used for this purpose, e.g., thionyl bromide, phosphorus pentachloride and phosphorus pentabromide. The reaction is conveniently carried out in a suitable inert organic solvent and at room temperature (20° C.) or elevated temperatures up to reflux temperature of the system. However, the use of a solvent is not necessary since an excess of the halide reagent can be employed for this purpose. It is generally preferred to carry out the reaction in the presence of a catalytic amount of dimethylformamide. The reaction of the thus-obtained acid halide with the appropriate alcohol or alcoholate is conveniently effected in a suitable inert organic solvent, e.g., benzene, toluene, chloroform and diethyl ether, and at room temperature (20° C.) or below. The reaction, if desired, can be carried out at elevated temperature; however, in such instances, external cooling should be provided since the reaction is highly exothermic. Preferably the reaction is carried out at a temperature of from about −10° to about 5° C. Where the free alcohol is employed it is desirable to provide a means for taking up the liberated hydrogen halide. This can be accomplished by employing an excess of the alcohol or by carrying out the reaction in the presence of an alkali metal carbonate, e.g., potassium carbonate, or suitable inert base, e.g., pyridine. Where an alcoholate is used, the alkali metal salts, particularly the sodium and potassium salts, are preferred. The desired product thus obtained is readily recovered in conventional manner.

The mono- and di-alkyl esters (II and III) employed as starting materials are readily prepared by reacting sodium 4-trifluoromethylphenolate (prepared from p-

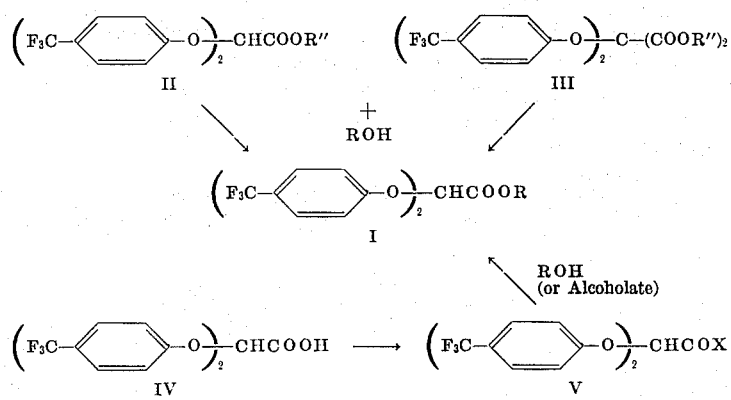

wherein
R'' represents lower alkyl, preferably containing from one to four carbon atoms, e.g., methyl, ethyl, propyl and butyl;

X represents halo having an atomic weight of from 35 to 80, i.e., chloro or bromo; and R is as defined above.

The reaction of the mono- or di-alkyl ester (II or III) with the appropriate alcohol is carried out in a suitable inert organic solvent, e.g., benzene, toluene and xylene, trifluoromethylphenol and sodium hydride) with a lower alkyl dichloroacetate or di(lower)alkyl dibromomalonate, respectively. The reaction is readily carried out in a suitable inert organic solvent, e.g., dimethylacetamide, diethylacetamide and dimethylformamide, and at room temperature or elevated temperature (which should not exceed about 80° C. when it is desired to prepare the esters of formula III).

The bis-(4-TFMphenoxy)acetic acid (IV), employed as the starting material for the alternative process described above, can be readily prepared in conventional manner from either the mono- or di-alkyl ester (II or III) by reacting the same in an aqueous, inert organic solvent, with a strong base, at room temperature. The base is preferably one which will yield a water-soluble salt of the desired acid, e.g., sodium hydroxide and potassium hydroxide. The acid then is obtained by simply treating the thus-obtained salt with a mineral acid, such as hydrochloric acid, in conventional manner. The acid (IV) can also be prepared by decarboxylating the free malonic acid obtained from the dialkylester (III) in conventional manner.

Many of the alcohols employed as starting materials are known and can be prepared as described in the literature. Such others which may not be specifically known can be prepared from available materials in analogous manner. The alcoholates can be prepared from the corresponding alcohols in conventional manner.

Certain of the compounds of Formula I have asymmetric centers and therefore exist as optical isomers. The respective isomers can be readily separated by conventional techniques or they can be selectively prepared employing the desired isomeric form of the alcohol reactant and accordingly are included within the scope of this invention.

The compounds of the present invention (Formula I) are useful because they possess pharmacological activity in animals. In particular, the compounds possess marked hypocholesteremic activity and can be used as hypocholesteremic/hypolipemic agents.

For such usage, the compounds may be admixed with conventional pharmaceutical carriers, and other adjuvants, if necessary, and administered orally in such forms as tablets, elixirs, suspensions or solutions. Furthermore the compounds may be similarly administered in the form of their non-toxic pharmaceutically acceptable acid addition or quaternary salts. Such salts do not materially differ from the free base in their pharmacological effects and are included within the scope of the invention. The acid addition salts are readily prepared by reacting the base with pharmacologically acceptable acids in conventional manner. Representative of such salts are the mineral acid salts such as the hydrochloride, hydrobromide, sulfate, phosphate and the like and the organic acid salts such as the benzoate, acetate, maleate, p-toluenesulfonate, benzene-sulfonate and the like. Similarly, the quaternary salts are prepared by reacting the base with pharmacologically acceptable quaternizing agents in conventional manner. Exemplary of the quaternary salts are those derived from common quaternizing agents such as straight-chain lower alkyl halides wherein the lower alkyl group preferably contains from one to four carbon atoms and the halide substituent is either chloride, bromide or iodide, e.g., methyl bromide, methyl chloride, ethyl bromide, methyl iodide and ethyl iodide, and straight-chain di-(lower)alkyl sulfates, e.g., dimethyl sulfate.

For the above-mentioned use, the dosage administered will, of course, vary depending on the compound employed. However, in general, satisfactory results are obtained when administered at a daily dosage of from about 4 milligrams to about 30 milligrams per kilogram of animal body weight, preferably given in divided doses, 2 to 4 times a day, or in sustained release form. For most mammals, e.g., primates, the administration of from about 0.25 grams to about 2 grams of the compound in divided doses of from about 62.5 milligrams to about 1,000 milligrams 2 to 4 times a day, is adequate for the treatment of hypercholesteremia/hyperlipemia. A representative formulation suitable for oral administration is a tablet (prepared by standard tabletting techniques) and containing, by weight, 50 parts of bis-(4-trifluoromethylphenoxy) acetic acid 1-methyl-4-piperidyl ester (as the free base), 2 parts of tragacanth, 39.5 parts of lactose, 5 parts of corn starch, 3 parts of talcum and 0.5 parts of magnesium stearate.

As noted hereinabove certain of the compounds of formula I exist as optical isomers. In some instances, enhanced activity or other beneficial attributes may be found with respect to a particular isomer and in such instances administration of such isomer may be preferred.

The intermediate compounds of structural formulae II and IV also possess hypocholesteremic activity and can be used as hypocholesteremic/hypolipemic agents. They can be administered in the same manner and at the same dosage levels as indicated for compounds of formula I hereinabove.

The compound of formula IV may be utilized either as the free acid or a non-toxic pharmaceutically acceptable salt thereof can be employed. Representative of non-toxic pharmaceutically acceptable salts are aluminum salts, the non-toxic alkali metal salts, e.g., potassium and sodium salts, the non-toxic alkaline earth metal salts, e.g., magnesium and calcium salts, the ammonium salts and salts of the non-toxic organic bases, e.g., ethanol-amine salts.

The following examples show representative compounds contemplated by the present invention and the manner in which said compounds are made. However, it is to be understood that the examples are intended for the purpose of illustration only and are not intended as in any way limiting the scope of the invention.

EXAMPLE 1

Bis-(4-trifluoromethylphenoxy)acetic acid

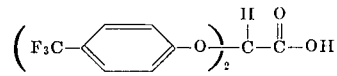

Step A. Preparation of bis(4-trifluoromethylphenoxy)malonic acid diethyl ester

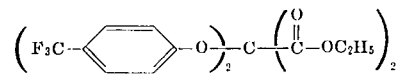

6.7 g. of 56.7 percent sodium hydride in mineral oil is washed with dry, low boiling petroleum ether. The washed sodium hydride is suspended in 100 ml of dimethylacetamide and the obtained suspension is then cooled to 0°. To the thus-cooled suspension is added 25.5 g of p-trifluoromethylphenol in 25 ml by volume of dimethylacetamide at such a rate that the temperature thereof does not exceed 10° (external cooling with an ice/salt bath being employed as necessary).

After all of the p-trifluoromethylphenol is added, the mixture is stirred for an additional hour. The mixture is removed from the cooling bath, and 23.8 g of diethyl-dibromomalonate added thereto fairly rapidly, allowing the temperature to rise to about 32°. Stirring is continued for 88 hours.

The mixture is then concentrated by evaporating in vacuo until ¾ of the solvent is removed. 1500 ml of ethylacetate is then added to the resulting concentrate which is then washed twice with 1,500 ml portions of water and then washed twice with 750 ml portions of 2N (aq) sodium hydroxide. The thus-washed organic phase is dried over anhydrous magnesium sulfate, the dried organic phase filtered and the filtrate evaporated to obtain bis-(4-trifluoromethylphenoxy)malonic acid diethyl ester, mp 53.5° to 54.5°; bp 134° − 136°/0.05 mm.

Step B. Preparation of bis-(4-trifluoromethylphenoxy)malonic acid

A solution of 9.75 g (0.0307mol) of barium hydroxide (99.3 percent $Ba(OH)_2 \cdot 8H_2O$) in 115 ml of methanol and 115 ml of water is prepared with stirring at 20° C. To this solution is promptly added, with stirring at 20° C, a solution of 14.736 g (0.0307 mol) of bis-(4-trifluoromethylphenoxy)malonic acid diethyl ester in 40 ml of methanol. 3 minutes after the mixing of the solutions 10 ml of water is added with stirring and the mixture is stirred for an additional 15 minutes during which period the barium salt of bis-(4-trifluoromethylphenoxy)malonic acid precipitates. The precipitated barium salt is separated by filtering and dried at 60° C under vacuum for 3 hours.

A suspension of 16.19 g (0.02895 mol) of the barium salt of bis-(4-trifluoromethylphenoxy) malonic acid in 200 ml of methanol and 5 g of diatomaceous earth (Celite) is prepared and while stirring at 0° C, is acidified by dropwise addition of a solution of 2.97 g of concentrated sulfuric acid (95.0 to 95.5 percent) in 3 ml, of water to hydrolyze the barium salt. The stirring of the mixture is continued at ambient temperatures for an additional 20 minutes. The mixture is filtered to remove solids from the solvent phase which contains the bis-(4-trifluoromethylphenoxy)malonic acid in the free acid form. The thus-separated solids are washed with 100 ml of ethyl acetate. The ethyl acetate phase is combined with the filtrate and the solvents removed by evaporation under vacuum (water aspirator) to obtain an oily residue. The oily residue is dissolved in 100 ml of ethyl acetate and washed twice with saturated aqueous sodium chloride. The organic phase is dried over anhydrous magnesium sulfate and then evaporated under vacuum to obtain an oily residue. The oily residue is washed thrice with 70 ml portions of petroleum ether at 30° to 60° C resulting in solidification thereof. The thus-obtained bis-(4-trifluoromethylphenoxy)malonic acid melts with decomposition at 155° to 156.5° C and on refining by recrystallization from hexane-ethyl acetate (10:1) melts with decomposition at 157° to 158° C.

Step C. Preparation of bis-(4-trifluoromethylphenoxy)acetic acid 7.3 g (0.01725 mol) of bis-(4-trifluoromethylphenoxy) malonic acid is dissolved in a solution of 1.93 g (0.0345 mol) potassium hydroxide in 20 ml of water. To the solution is added 60 ml of 2-methoxy-ethoxyethanol and the mixture refluxed for 4 hours by heating with an oil bath maintained at 170° C. The water is then substantially removed from the mixture by boiling off under atmospheric pressure; the mixture is heated for an additional 15 minutes at 190° C. The 2-methoxy ethoxyethanol is then substantially removed by evaporation under a water aspirator at 70° C. to obtain the crude potassium salt of bis-(4-trifluoromethylphenoxy)acetic acid. The crude potassium salt of bis-(4-trifluoromethylphenoxy)acetic acid is dissolved in 100 ml of water, the solution treated with charcoal, and then filtered through diatomaceous earth (Celite). The thus-treated solution is then acidified with 18 ml of 2N HCl resulting in the separation of crude bis-(4-trifluoromethylphenoxy)acetic acid as oil which solidifies. The crude bis-(4-trifluoromethylphenoxy) acetic acid is collected by filtration and then dissolved in 100 ml. of ethyl acetate. The ethyl acetate solution is washed twice with 50 ml portions of saturated aqueous sodium chloride, dried over anhydrous magnesium sulfate and evaporated under vacuum to obtain an oily residue which solidifies upon scratching. The solid mass is washed with 50 ml of petroleum ether at 30° to 60° C. to obtain bis-(4-trifluoromethylphenoxy)acetic acid, mp 120° to 123° C, which on recrystallization from cyclohexane-benzene (5:1) has a melting point of 127° to 128.5° C.

EXAMPLE 2

Bis-(4-trifluoromethylphenoxy)acetic acid 1-methyl-4-piperidyl ester

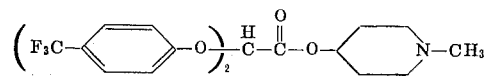

A mixture of 2.5 g (0.00657 mol) of bis-(4-trifluoromethylphenoxy)acetic acid, 100 ml of anhydrous diethyl ether, 0.1 ml, of dimethyl formamide and 2 g (0.0168 mol) of thionyl chloride are refluxed in a vessel for 4 hours, while swept with a stream of nitrogen gas to carry off hydrogen chloride formed during the reaction. The reaction mixture is evaporated on a rotary evaporator under water aspiration at 45° C to obtain an oily residue. The oily residue is dissolved in 60 ml of carbon tetrachloride, the solution dried over anhydrous magnesium sulfate and filtered. The filtrate is evaporated under vacuum to remove the solvent to obtain bis-(4-trifluoromethylphenoxy) acetyl chloride.

To a solution of 1.49 g (0.0129 mol) 1-methyl-4-hydroxypiperidine in 50 ml of anhydrous diethyl ether at 0° C, is added dropwise, with stirring, a solution of 2.57 g (0.00645 mol) bis-(4-trifluoromethylphenoxy)acetyl chloride in 25 ml of anhydrous diethyl ether and the mixture cooled during the addition to maintain the temperature at 0° to 5° C. A white solid begins to precipitate, and stirring is continued at 20° C for 18 hours. The white solid (essentially 1-methyl-4-hydroxypiperidine hydrochloride) is removed by filtration. The filtrate is washed first , 50 ml of ice cold 10 percent aqueous sodium bicarbonate, then with 30 ml of saturated aqueous sodium chloride. The organic phase is dried over anhydrous magnesium sulfate and then evaporated to obtain an oily residue. The oily residue is dissolved in 20 ml. of chloroform and the chloroform solution placed on silica gel held in a sintered glass filter funnel. Impurities are removed by eluting with 175 ml of chloroform and the product is recovered by eluting with 400 ml of ethyl acetate. The ethyl acetate solution is evaporated under vacuum to obtain bis-(4-trifluoromethylphenoxy)acetic acid 1-methyl-4-piperidyl ester as the free base.

0.977 g. (0.00205 mol) of bis-(4-trifluoromethylphenoxy)acetic acid 1-methyl-4-piperidyl ester are added to 0.238 g (0.00205) of fumaric acid in 10 ml. of isopropanol to form the fumaric acid addition salt of bis-(4-trifluoromethylphenoxy)acetic acid 1-methyl-4-piperidyl ester, which on recrystallizing twice from 5 ml, isopropanol and charcoal has a melting point of 127° to 130° C.

What is claimed is:

1. An orally administrable pharmaceutical composition for use in the alleviation of hyperlipemia in mammals comprising a hyperlipemia alleviating effective amount of a compound selected from the group consisting of a basic ester of the formula:

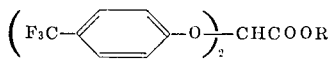

and the non-toxic pharmaceutically acceptable salts thereof, wherein
R represents

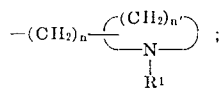

$R^1$ represents lower alkyl;
$n$ represents a whole number of from 0 to 4, inclusive; and
$n'$ represents a whole number greater than 3 and less than 6 as an active ingredient thereof, and an orally administrable pharmaceutically acceptable carrier.

2. A composition of claim 1, wherein the compound is present in an amount sufficient to provide a daily dosage of from about 250 milligrams to about 2,000 milligrams.

3. A composition of claim 1, wherein the compound is the fumaric acid addition salt of bis-(4-trifluoromethylphenoxy) acetic acid 1-methyl-4-piperidyl ester.

4. A composition of claim 2, wherein the compound is bis(4-trifluoromethylphenoxy) acetic acid 1-methyl-4-piperidyl ester.

5. An orally administrable pharmaceutical composition as defined in claim 1, in unit dose form, wherein said compound is present in an amount of from about 62.5 milligrams to about 1,000 milligrams.

6. A composition of claim 5, wherein the carrier is solid.

7. A composition of claim 6, wherein the compound is the fumaric acid addition salt of bis-(4-trifluoromethylphenoxy) acetic acid 1-methyl-4-piperidyl ester.

8. A composition of claim 6, wherein the compound is bis-(4-trifluoromethylphenoxy) acetic acid 1-methyl-4-piperidyl ester.

9. A method for the alleviation of hyperlipemia in a mammal which comprises orally administering to said mammal a hyperlipemia alleviating effective amount of a compound selected from the group consisting of a basic ester of the formula:

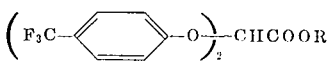

and the non-toxic pharmaceutically acceptable salts thereof, wherein R, $R^1$, $n$ and $n'$ are as defined in claim 1.

10. A method of claim 9, wherein the compound is administered in an amount sufficient to provide a daily dosage of from about 250 milligrams to about 2,000 milligrams.

11. A method of claim 10, wherein the compound is the fumaric acid addition salt of bis-(4-trifluoromethylphenoxy) acetic acid 1-methyl-4-piperidyl ester.

12. A method of claim 10, wherein the compound is bis-(4-trifluoromethylphenoxy) acetic acid 1-methyl-4-piperidyl ester.

* * * * *